US009135017B2

(12) United States Patent
Poon et al.

(10) Patent No.: US 9,135,017 B2
(45) Date of Patent: Sep. 15, 2015

(54) CONFIGURABLE SHADER ALU UNITS

(75) Inventors: Elaine Poon, Richmond Hill (CA); Xiaoling (Sherry) Xu, Santa Clara, CA (US)

(73) Assignees: ATI Technologies ULC, Markham (CA); Advanced Micro Devices, Inc., Sunnyvale, CA (US)

( * ) Notice: Subject to any disclaimer, the term of this patent is extended or adjusted under 35 U.S.C. 154(b) by 1212 days.

(21) Appl. No.: 12/009,198

(22) Filed: Jan. 16, 2008

(65) Prior Publication Data

US 2008/0189524 A1 Aug. 7, 2008

Related U.S. Application Data

(60) Provisional application No. 60/880,806, filed on Jan. 16, 2007.

(51) Int. Cl.
*G06F 7/38* (2006.01)
*G06F 15/16* (2006.01)
*G06F 9/38* (2006.01)
*G06F 9/30* (2006.01)
*G06T 1/20* (2006.01)

(52) U.S. Cl.
CPC ............ *G06F 9/3897* (2013.01); *G06F 9/3001* (2013.01); *G06T 1/20* (2013.01)

(58) Field of Classification Search
CPC ........ G06F 9/3001; G06F 9/3897; G06T 1/20
USPC ............................................ 345/519; 34/519
See application file for complete search history.

(56) References Cited

U.S. PATENT DOCUMENTS

| 4,435,782 | A | 3/1984 | Kaufman et al. | |
|---|---|---|---|---|
| 4,546,428 | A | 10/1985 | Morton | |
| 5,230,039 | A | 7/1993 | Grossman et al. | 395/130 |
| 5,253,308 | A | 10/1993 | Johnson | |
| 5,264,838 | A | 11/1993 | Johnson et al. | 345/138 |
| 5,307,450 | A | 4/1994 | Grossman | 395/123 |
| 5,513,354 | A | 4/1996 | Dwork et al. | |

(Continued)

OTHER PUBLICATIONS

Orenstein, David,"QuickStudy: Application Programming Interface (API)," Jan. 10, 2000, Computerworld,http://www.computerworld.com, pp. 1-2.

(Continued)

*Primary Examiner* — Kee M Tung
*Assistant Examiner* — Frank Chen
(74) *Attorney, Agent, or Firm* — Faegre Baker Daniels LLP

(57) ABSTRACT

A shader unit is configured to provide an increased and dynamically changeable amount of ALU processing bandwidth. The shader unit includes a plurality of ALUs for processing pixel data according to a shader program. Each of the ALUs is configurable to be enabled and disabled. When disabled, the ALU is powered off, thereby reducing the power consumption of the shader unit. In one embodiment, the plurality of ALUs are logically configured into groups called ALU-pipes, each of which can be enabled and disabled. When an ALU-pipe is disabled, each ALU associated with the disabled ALU-pipe is disabled. The shader unit includes a sequencer that executes the shader program, determines the number of ALUs to be enabled, receives an input data stream of pixel data, assigns groups of pixel data to each enabled ALU, sends the assigned pixel data to their respective ALUs, and sends ALU instructions to the ALUs to process the received pixel data according to the shader program.

16 Claims, 2 Drawing Sheets

(56) References Cited

U.S. PATENT DOCUMENTS

| | | | |
|---|---|---|---|
| 5,517,666 | A | 5/1996 | Ohtani et al. |
| 5,544,294 | A | 8/1996 | Cho et al. ............... 395/141 |
| 5,748,872 | A | 5/1998 | Norman |
| 5,867,723 | A | 2/1999 | Chin et al. |
| 6,021,511 | A | 2/2000 | Nakano |
| 6,044,448 | A | 3/2000 | Agrawal et al. |
| 6,073,185 | A | 6/2000 | Meeker |
| 6,128,000 | A | 10/2000 | Jouppi et al. ............ 345/136 |
| 6,205,515 | B1 | 3/2001 | Huang |
| 6,246,415 | B1 | 6/2001 | Grossman et al. ......... 345/422 |
| 6,308,252 | B1 | 10/2001 | Agarwal et al. |
| 6,339,432 | B1 | 1/2002 | Grossman ............... 345/639 |
| 6,344,852 | B1 | 2/2002 | Zhu et al. ............... 345/418 |
| 6,505,306 | B1 | 1/2003 | Blackmon et al. |
| 6,532,018 | B1 | 3/2003 | Chen et al. ............. 345/519 |
| 6,697,063 | B1 | 2/2004 | Zhu ....................... 345/421 |
| 6,756,978 | B1 | 6/2004 | Chen et al. ............. 345/419 |
| 6,760,033 | B2 | 7/2004 | Chen et al. ............. 345/519 |
| 6,785,841 | B2 | 8/2004 | Akrout et al. |
| 6,792,560 | B2 | 9/2004 | Francis et al. |
| 6,803,782 | B2* | 10/2004 | Koob et al. ............... 326/10 |
| 6,879,948 | B1 | 4/2005 | Chalfin et al. ........... 703/14 |
| 6,956,576 | B1 | 10/2005 | Deering et al. |
| 7,124,318 | B2 | 10/2006 | Luick |
| 7,185,225 | B2* | 2/2007 | Sutardja et al. ........... 714/11 |
| 7,298,375 | B1 | 11/2007 | Hutchins ................. 345/561 |
| 7,327,581 | B2* | 2/2008 | Ohmori ................... 361/760 |
| 7,373,547 | B2* | 5/2008 | Sutardja et al. ........... 714/11 |
| 7,577,869 | B2* | 8/2009 | Mantor et al. ........... 714/11 |
| 7,633,506 | B1* | 12/2009 | Leather et al. ........... 345/506 |
| 7,694,114 | B2* | 4/2010 | Dockser ................. 712/229 |
| 7,796,133 | B1* | 9/2010 | Leather et al. ........... 345/426 |
| 7,836,284 | B2* | 11/2010 | Dockser ................. 712/229 |
| 8,049,760 | B2* | 11/2011 | Jiao et al. ............... 345/505 |
| 2001/0008563 | A1 | 7/2001 | Yamaura et al. |
| 2002/0019841 | A1 | 2/2002 | Kiuchi et al. |
| 2002/0157066 | A1 | 10/2002 | Marshall et al. |
| 2002/0174318 | A1 | 11/2002 | Stuttard et al. |
| 2003/0115500 | A1 | 6/2003 | Akrout et al. |
| 2003/0132944 | A1 | 7/2003 | Smith .................... 345/581 |
| 2003/0164840 | A1 | 9/2003 | O'Driscoll |
| 2003/0179631 | A1* | 9/2003 | Koob et al. ............. 365/200 |
| 2003/0204805 | A1 | 10/2003 | Prabhu |
| 2004/0172517 | A1* | 9/2004 | Prokopenko et al. ........ 712/4 |
| 2005/0030312 | A1 | 2/2005 | Boyd et al. |
| 2005/0251358 | A1* | 11/2005 | Van Dyke et al. ......... 702/117 |
| 2005/0251761 | A1* | 11/2005 | Diamond et al. ............ 716/1 |
| 2005/0261863 | A1* | 11/2005 | Van Dyke et al. ......... 702/123 |
| 2005/0275657 | A1 | 12/2005 | Hutchins et al. |
| 2006/0004536 | A1* | 1/2006 | Diamond et al. ......... 702/123 |
| 2006/0053188 | A1* | 3/2006 | Mantor et al. ........... 708/490 |
| 2006/0053189 | A1* | 3/2006 | Mantor ................... 708/490 |
| 2006/0152519 | A1 | 7/2006 | Hutchins et al. .......... 345/561 |
| 2006/0282646 | A1* | 12/2006 | Dockser ................. 712/4 |
| 2006/0282826 | A1* | 12/2006 | Dockser ................. 717/127 |
| 2007/0273698 | A1* | 11/2007 | Du et al. ................. 345/501 |
| 2007/0296729 | A1* | 12/2007 | Du et al. ................. 345/559 |
| 2008/0084424 | A1* | 4/2008 | Hsu ...................... 345/522 |
| 2010/0017652 | A1 | 1/2010 | Mantor et al. |

OTHER PUBLICATIONS

Akenine-Möller, Tomas et al., "*Real-Time Rendering*", Second Edition, A K Peters, Ltd., Jan. 2002, pp. 84-101, 129-141, and vii-x.

Case, Loyd, "ATI's CrossFire Secret Sauce" ExtremeTech Website, http://www.extremetech.com/print_article2/0,1217,a=153353,00.asp. Jun. 2, 2005, p. 1.

Cross, Jason, "Transparency Adaptive AA: A Closer Look," ExtremeTech, http://www.extremetech.com/print_article2/0,1217,a=155885,00.asp, Jul. 13, 2005, pp. 1-3.

M. Doggett and et al., "Adaptive view dependent tessellation of displacement maps," Jan. 2000, pp. 1-18.

T. A. Funkhouser et al.,. "Adaptive Display Algorithm for Interactive Frame Rates During Visualization of Complex Virtual Environments," Sep. 1993, 8 pages.

Matrox Parhelia™., "16x Fragment Antialiasing," May 14, 2002, pp. 1-9.

*n*VIDIA, "Technical Brief: CineFX 4.0: Unimaginable Speeds for Advanced Visual Effects," TB-01857-001_v01, May 16, 2005, pp. 1-16.

M. Woo et al. "*The Official Guide to Learning OpenGL, Version 1.2*: Third Edition," Addison-Wesley, Aug. 1999, 29 pages.

Segal, Mark et al., *The OpenGL® Graphics System: A Specification* (Version 2.0—Oct. 22, 2004), Silicon Graphics, Inc., 1992-2004, 18 pages.

Wang, Lifeng et al., "View-Dependent Displacement Mapping," Jul. 2003, 14 pages.

U.S. Final Office Action for corresponding case; U.S. Appl. No. 12/509,803; dated Feb. 9, 2012.

Response to Apr. 1, 2011 U.S. Office Action for corresponding case; U.S. Appl. No. 12/509,803; dated Sep. 30, 2011.

U.S. Office Action for corresponding case; U.S. Appl. No. 12/509,803; dated Apr. 1, 2011.

\* cited by examiner

CONFIGURABLE SHADER ALU UNITS

RELATED APPLICATIONS

This application claims benefit of priority under 35 U.S.C. section 119(e) of U.S. Provisional Patent Application 60/880,806 filed Jan. 16, 2007, and entitled "Configurable Shader ALU Units", which is incorporated herein by reference.

FIELD OF THE INVENTION

The present invention relates to a method of and an apparatus for processing graphics data. In particular, the present invention relates to a method of and apparatus for processing graphics data using configurable shader arithmetic logic units.

BACKGROUND OF THE INVENTION

In graphics processing, data is grouped as pixels, which are processed according to a series of processing instructions referred to as shader instructions. Each shader instruction defines a mathematical operation to be performed on the pixel. By applying a shader instruction to a pixel, the pixel value is changed according to the mathematical operation defined by the shader instruction. Application software defines the specific shader instructions that are to be applied to the pixel data.

Shader units are used to apply shader instructions to pixel data. Shader units utilize arithmetic logic units (ALUs) to carry out the arithmetic and logic operations defined by the shader instructions. Graphics intensive applications, such as high-end video games, require shader units that can execute a large number of shader instructions. However, lower-end graphics applications, such as playing a DVD, include fewer shader instructions and therefore do not require a shader unit with as much processing power. Since additional processing power requires additional ALUs, which correspondingly increases cost and power consumption, there is a design trade-off to be made when configuring a shader unit, especially when the shader unit is for general use.

SUMMARY OF THE INVENTION

A shader unit is configured to provide an increased and dynamically changeable amount of ALU processing bandwidth. The shader unit includes a plurality of ALUs for processing pixel data according to a shader program. Each of the ALUs is preferably configurable to be enabled and disabled. When disabled, the ALU is powered off, thereby reducing the power consumption of the shader unit. In one embodiment, the plurality of ALUs are logically configured into groups called ALU-pipes, each of which can be enabled and disabled. When an ALU-pipe is disabled, each ALU associated with the disabled ALU-pipe is disabled. The shader unit includes a sequencer that executes the shader program, determines the number of ALUs to be enabled, receives an input data stream of pixel data, assigns groups of pixel data to each enabled ALU, sends the assigned pixel data to their respective ALUs, and sends ALU instructions to the ALUs to process the received pixel data according to the shader program.

In one aspect of the present invention, a shader unit includes a sequencer to provide control instructions, and multiple arithmetic logic units coupled to the sequencer, wherein each arithmetic logic unit is dynamically configurable to be enabled or disabled according to the control instructions provided by the sequencer such that the sequencer dynamically configures a number of enabled arithmetic logic units. The sequencer includes an input buffer to receive an input stream of pixel data and a scheduler to direct a block of the received pixel data to each of the number of enabled arithmetic logic units. The sequencer also includes an arithmetic logic unit sequencer that generates an arithmetic logic unit instruction, wherein the arithmetic logic unit sequencer sends the arithmetic logic unit instruction to the multiple arithmetic logic units in response to a control instruction sent by the scheduler. Each arithmetic logic unit instruction corresponds to a processing instruction within a software program being executed by the shader unit. The arithmetic logic units that are disabled are powered off. The multiple arithmetic logic units can be logically configured into a plurality of groups, each group including a clock enable circuit. The arithmetic logic units within a first logical group can be powered off by disabling a corresponding first clock enable circuit.

In another aspect of the present invention, a shader unit includes a sequencer to provide control instructions, and a plurality of processing integrated circuit chips coupled to the sequencer, each integrated circuit chip includes a plurality of arithmetic logic units, wherein each processing integrated circuit chip includes at least one defective arithmetic logic unit, further wherein each of the plurality of arithmetic logic units is dynamically configurable to be enabled or disabled according to the control instructions provided by the sequencer, thereby increasing a yield for processing integrated circuit chips. The sequencer can dynamically configure a number of enabled arithmetic logic units. Each processing integrated circuit chip preferably includes a same number of defective arithmetic logic units, and each processing integrated circuit chip includes a same number of arithmetic logic units. The arithmetic logic units within the shader unit can be logically configured into a plurality of groups, wherein each group includes one arithmetic logic unit from each processing integrated circuit chip. When a first arithmetic logic unit on a first processing integrated circuit chip is defective, then each arithmetic logic unit within the group that includes the first arithmetic logic unit is also defective. The arithmetic logic units included within a group comprising defective arithmetic logic units are disabled and powered off. Each group can be coupled to a clock enable circuit. The arithmetic logic units within a first logical group can be powered off by disabling a corresponding first clock enable circuit. The sequencer includes an input buffer to receive an input stream of pixel data and a scheduler to direct a block of the received pixel data to each enabled arithmetic logic unit. The sequencer also includes an arithmetic logic unit sequencer that generates an arithmetic logic unit instruction, wherein the arithmetic logic unit sequencer sends the arithmetic logic unit instruction to each enabled arithmetic logic unit in response to a control instruction sent by the scheduler.

In yet another aspect of the present invention, a shader unit processes an input data stream of pixel data. The shader unit includes a sequencer to provide control instructions to execute a graphics shader program including shader instructions, and multiple arithmetic logic units coupled to the sequencer, wherein each arithmetic logic unit is dynamically configurable to be enabled or disabled according to the control instructions provided by the sequencer such that the sequencer dynamically configures a number of enabled arithmetic logic units. The sequencer includes an input buffer to receive the input data stream of pixel data and a scheduler to direct a block of the received pixel data to each of the number of enabled arithmetic logic units. The sequencer also includes an arithmetic logic unit sequencer that generates an arithmetic logic unit instruction corresponding to each shader instruction, wherein the arithmetic logic unit sequencer sends the arithmetic logic unit instruction to the multiple arithmetic logic units in response to a control instruction sent by the scheduler.

The present invention is described relative to the several views of the drawings.

DETAILED DESCRIPTION OF THE INVENTION

Embodiments of a shader unit are directed to a dynamically configurable apparatus that processes a selectable and programmable number of pixels per clock cycle. Using the dynamically configurable shader unit, one ALU instruction is executed for a selectable number of pixels per clock cycle.

Figure 1:
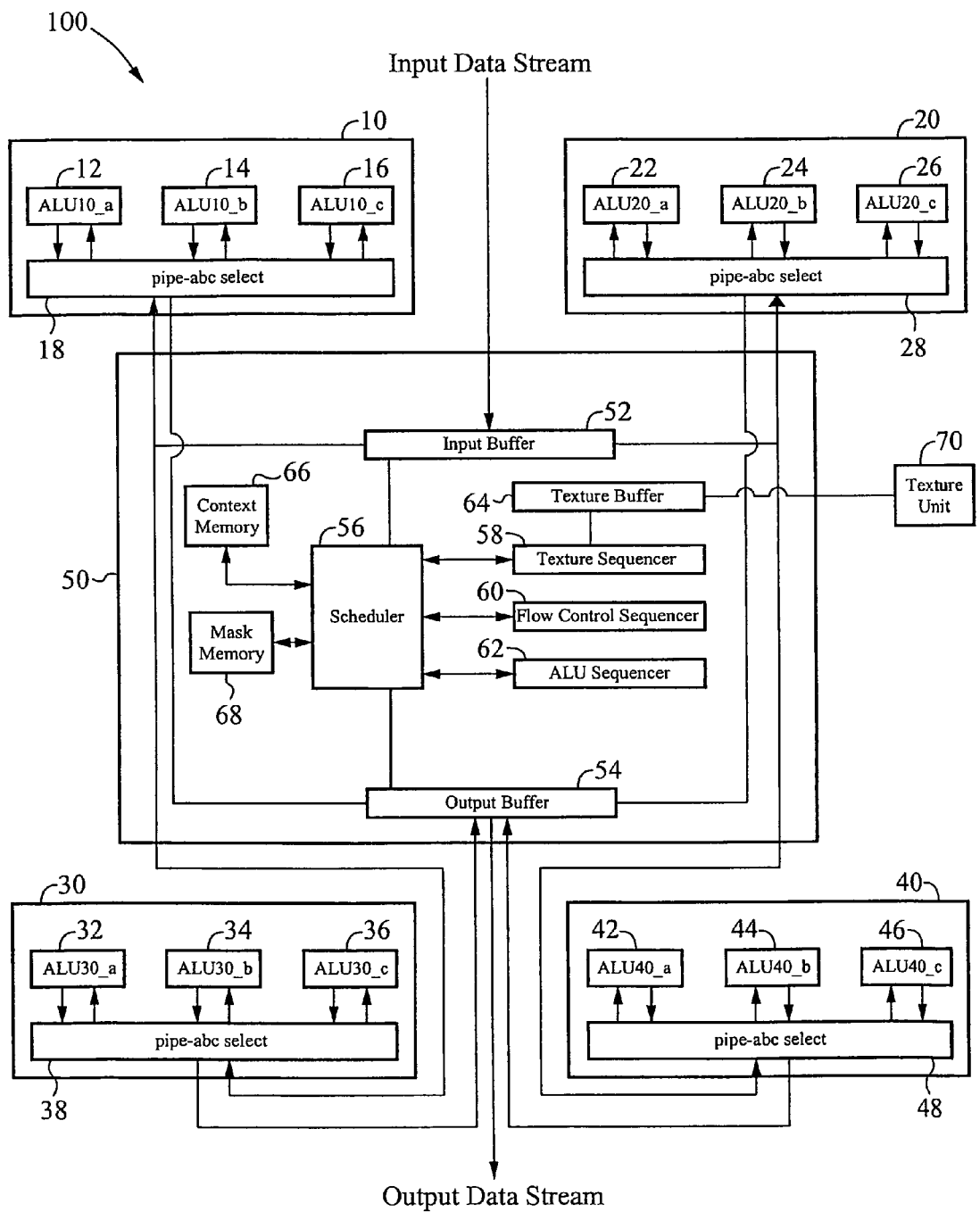
FIG. 1 illustrates one embodiment of a configurable shader unit.

FIG. 1 illustrates one embodiment of a configurable shader unit 100. The shader unit 100 includes processing units 10, 20, 30, and 40, a sequencer 50, and a texture unit 70. The sequencer 50 includes an input buffer 52, an output buffer 54, a scheduler 56, a texture sequencer 58, a flow control sequencer 60, an ALU sequencer 62, a texture buffer 64, a context memory 66, and a mask memory 68. The shader unit 100 is configured to receive an input data stream, where the data stream includes a series of pixel data. Alternatively, the input data stream can be of any conventional data type. The shader unit 100 performs mathematical operations to manipulate the received pixel data, and outputs processed pixel values. The mathematical operations correspond to shader instructions specified by an external software application. The shader unit 100 includes four processing units 10, 20, 30, and 40. Each processing unit includes three ALUs. Specifically, the processing unit 10 includes ALUs 12, 14, and 16, the processing unit 20 includes ALUs 22, 24, and 26, the processing unit 30 includes ALUs 32, 34, and 36, and the processing unit 40 includes ALUs 42, 44, and 46. In alternative embodiments, the shader unit can include more or less than four processing units, and each processing unit can include more or less than three ALUs. Preferably, each of the ALUs is a floating point unit. Alternatively, each ALU can be a floating point unit or a fixed point unit. Each of the ALUs preferably includes the same logic circuitry.

The sequencer 50 receives the input data stream of pixel data. The sequencer 50 determines what pixel data is to be loaded and when to execute the shader program instructions. The sequencer 50 includes a scheduler 56 to schedule the necessary functions for loading data and executing the shader program instructions within the shader unit 100.

Figure 2:
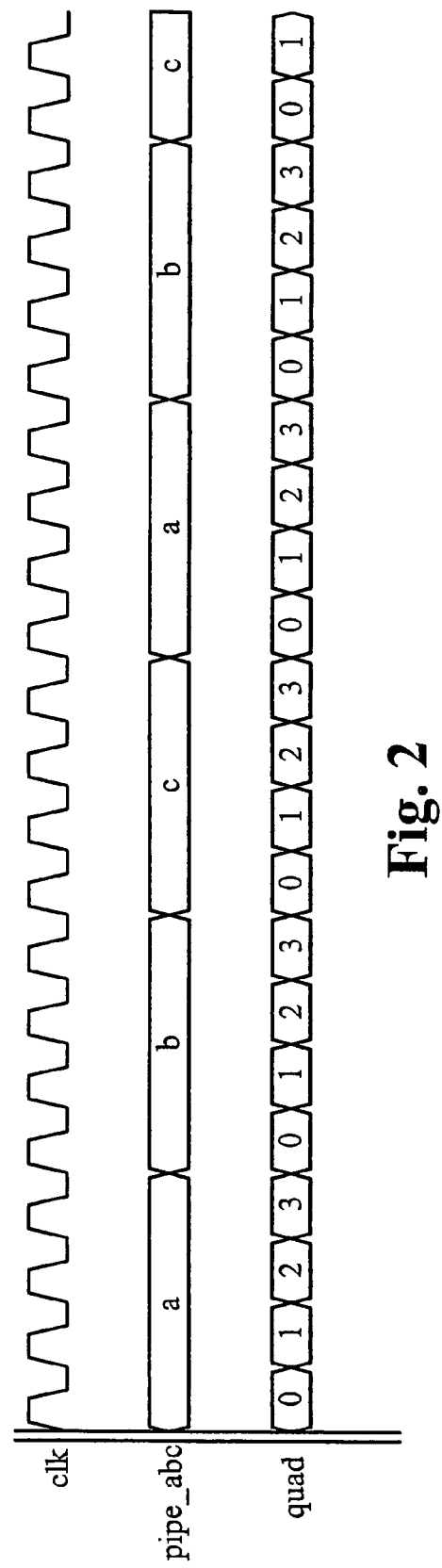
FIG. 2 illustrates a timing diagram related to the shader unit of FIG. 1.

FIG. 2 illustrates a timing diagram related to the shader unit 100 of FIG. 1. The shader unit 100 receives the input data stream of pixel data. By convention, groups of four pixels are referred to as a quad. The shader unit 100 is configured to process quads. Referring to the timing diagram of FIG. 2, quad 0 is a group of four pixels, quad 1 is a group of the next four pixels, and so on. As pixels are input to the sequencer 50, each successive group of four pixels (a quad) is assigned to a specific ALU. The first 4 pixels are grouped as quad 0 in phase a, which is assigned to ALU 12, designated ALU10_a in FIG. 1. Each quad is loaded into its assigned ALU per clock cycle. The next group of 4 pixels are grouped as quad 1 in phase a, which is assigned to ALU 22, designated as ALU20_a. The next group of 4 pixels are grouped as quad 2 in phase a, which is assigned to ALU 32, designated as ALU30_a. This pattern cycles through each of three phases, phase a, phase b, and phase c, such that 12 quads of pixel data are assigned and loaded into the 12 ALUs over a period of 12 clock cycles. After 12 clock cycles, 12 quads are loaded into the 12 ALUs, one quad per each ALU.

The quads stored in the ALUs are then processed according to ALU instructions. The ALU instructions correspond to the shader instructions. Processing begins simultaneously on all 12 quads loaded in the ALUs during the 13th clock cycle. In other words, a quad is loaded into each ALU, and only after each ALU has been loaded with a quad does processing begin. In this manner, parallel processing of the 12 quads is achieved.

Also during the 13$^{th}$ cycle, as processing begins on the 12 quads previously loaded into the 12 ALUs, loading begins for the next set of 12 quads. For example, referring to the timing diagram of FIG. 2, on the 13$^{th}$ clock cycle, quad 0 in phase a is loaded into the ALU 12. This process repeats similarly as to the first set of 12 quads assigned and loaded into the 12 ALUs as described above.

Conventional processing units typically include one ALU, such that execution of one shader instruction is applied to one quad of pixel data. In contrast, the shader unit 100 inlcudes three ALUs per processing unit, such that execution of one shader instruction is applied to three quads, thereby tripling the ALU processing power of a single ALU processing unit. If an application is shader intensive, meaning the application includes a long shader program with many shader instructions to be executed, and pixels are to be manipulated based on those shader instructions, then the increased ALU processing bandwidth provides faster execution of the shader program. Such a configuration increases the performance aspect of the shader unit 100.

In addition to increasing performance, the shader unit is dynamically re-configurable. In one embodiment, the ALUs within the shader unit 100 are logically configured into groups, called ALU-pipes. Each ALU-pipe includes one ALU from each processing unit 10, 20, 30, and 40. For example, an ALU-pipe_a includes ALU 12, ALU 22, ALU 32, and ALU 42. Similarly, an ALU-pipe_b includes ALU 14, ALU 24, ALU 34, and ALU 44. An ALU-pipe_c includes ALU 16, ALU 26, ALU, 36, and ALU 46. Each of the ALU-pipes can be enabled or disabled. In the shader unit 100 shown in FIG. 1, each processing unit 10, 20, 30, and 40 can be configured such that 1, 2, or all 3 of the ALUs within each processing unit are enabled. If ALU pipe_a is enabled, then the ALU in each processing unit 10, 20, 30, and 40 that corresponds to pipe "a" is enabled, specifically ALU 12, ALU 22, ALU 32, and ALU 42. Similarly, if ALU pipe_b is enabled, then the ALUs 14, 24, 34, and 44 are enabled, and if ALU pipe_c is enabled, then the ALUs 16, 26, 36, and 46 are enabled. The shader unit 100 is configured such that any combination of ALU pipe_a, ALU pipe_b, and ALU pipe_c can be enabled. This combination can be dynamically changed at any time such that a new combination of ALUs are enabled. In this manner, the shader unit 100 is dynamically configurable to have 4, 8, or 12 ALUs enabled at any given time. Alternatively, the ALUs can be logically configured into groups other than ALU-pipes. Still alternatively, the ALUs can be logically configured as individual ALUs, and each ALU can be individually enabled or disabled in various combinations.

The shader unit 100 includes individual clock enables for each ALU pipe. If the shader unit 100 is configured such that one or two of the ALU pipes are enabled, then the ALUs corresponding to the disabled ALU pipe(s) can be shut down to save power. To shut down the ALUs, the clock enable for the disabled ALU pipe(s) is disabled. Disabling one or more ALU pipes is useful when running applications that are not shader intensive, for example playing DVDs or older generation video games, because the additional ALU bandwidth used for executing shader instructions is not needed. ALU bandwidth can be increased by enabling previously disabled ALU pipes.

The shader unit 100 operates according to driver software loaded in the sequencer 50. The driver software operates in conjunction with the application software and determines the number of ALU pipes to enable based on the requirements of the application software. The sequencer 50 enables or disables the appropriate ALU-pipes according to control instructions provided by the driver software. The shader unit hardware, including multiple ALU pipes, is provided so that the driver software can dynamically enable or disable ALU pipes as necessary.

The scheduler 56 enables the configurable aspect of the shader unit 100 in that the scheduling activities are determined based on the number of ALU pipes currently enabled. If the number of ALU pipes enabled is changed, then the scheduler 56 also changes the scheduling activities necessary to accommodate the changed number of enabled ALU pipes. In this manner, the logic circuitry within the sequencer 50 is considered dynamically configurable to meet the changing activities associated with a dynamically changing number of enabled ALUs.

Where the application software is a graphics application, the application software includes a shader program that is to be executed by the shader unit 100. Shader programs include multiple shader instructions, which are executed as ALU instructions on the pixel data.

Subsequent discussion is based on all three ALU pipes within the shader unit 100 being enabled. In this case, 12 quads are assigned and loaded into the 12 enabled ALUs during a 12 cycle period. It should be noted that where reference is made to 12 quads, any corresponding functionality can equally be applied to 8 quads or 4 quads, depending on the number of ALU pipes enabled. On the $13^{th}$ clock cycle, processing begins in each of the ALUs according to a current shader program. The ALU sequencer 62 issues an ALU instruction for each shader instruction. Each ALU instruction is issued to all ALUs every 4 clock cycles. Since there are 12 quads loaded into the 12 ALUs, the shader unit 100 executes one ALU instruction on 12 quads every 4 clock cycles. As such, 3 ALU instructions can be executed on the same 12 quads during a 12 clock cycle period. Where only one ALU pipe is enabled, the shader unit 100 executes one ALU instruction on 4 quads every 4 clock cycles. A shader program with many shader instructions is applied to a set of quads (12 quads in this case) faster when 3 ALU pipes are enabled than if only one or two ALU pipes are enabled. As used in this context, faster means execution of ALU instructions.

The sequencer 50 outputs data every 12 clock cycles. Since one ALU instruction is executed every 4 clock cycles, 3 ALU instructions can be executed by each ALU every 12 clock cycles. In other words, 3 ALU instructions can be executed on a given quad of pixel data before the quad is output from the shader unit 100. The shader unit 100 is still executing 1 ALU instruction per 4 clock cycles, however, with 3 ALU pipes enabled, each ALU instruction is used to process more pixel data, in this case 12 quads. In general, the shader unit 100 is dynamically configurable to process 4, 8, or 12 quads for every 4 clock cycles, depending on the number of ALU pipes enabled.

The context memory 66 is a 3-bit register that defines the current ALU pipe configuration. There are three modes: a single ALU mode, a double ALU mode, and a triple ALU mode. Each mode is specified in the context memory 66 register field. Each bit in the register field represents a physical ALU pipe. For example, if all three bits in the context memory 66 are set, as in the triple ALU mode, then all 3 ALU pipes are enabled. In the case of enabling a single ALU pipe or a double ALU pipe, any combination of the ALU pipes can be enabled. The sequencer 50 includes individual clock enables for each ALU pipe. Shutting down an ALU pipe is accomplished by disabling the clock associated with the ALU pipe to be disabled.

Each ALU includes an input buffer to store the loaded quad of pixel data. After the ALU processes the quad according to three ALU instructions within a 12 clock cycle period, the processed quads are stored in an output buffer 54 within the sequencer 50. During a subsequent execution of an output instruction, which occurs every 12 clock cycles, the processed quad within the output buffer 54 is output from the shader unit 100.

Execution of certain types of ALU instructions requires the use of texture data which is stored external to the shader unit 100. To retrieve the texture data, the texture sequencer 58 issues a texture instruction to the texture unit 70. In response to the texture instruction, the texture unit 70 fetches the texture data from memory (not shown). The retrieved texture data is stored in the texture buffer 64. The texture sequencer 58 executes one texture instruction for a set of 12 quads every 4 clock cycles. However, the texture unit 70 fetches four quads every four clock cycles. Since there are 12 quads being simultaneously processed in the shader unit 100, two re-issued texture instructions are needed to accommodate all 12 quads. Therefore, when 3 ALU pipes are enabled, which results in 12 quads being simultaneously processed in the shader unit 100, a texture instruction is issued three times every 12 clock cycles.

A thread is a unit of measure that refers to the number of quads that are simultaneously processed within the sequencer 50. For example, when three ALU pipes are enabled, a thread is 12 quads. Therefore, a 12 quad thread indicates that 12 quads are being processed simultaneously. Similarly, when two ALU pipes are enabled, a thread is eight quads. When a single ALU pipe is enabled, a thread is four quads.

The context memory 66 is a 3-bit memory for storing a current state for the thread currently being processed in the shader unit 100. The current state value is used by the flow control sequencer 60 and by the ALU sequencer 58 to generate their respective instructions. The meaning of the 3-bit value stored in the context storage memory 66 is different for the partial flow control mode than for the full flow control mode.

Inconsistencies in the input data stream may result in occurrences where there are not 12 quads loaded into the 12 ALUs, although all 3 ALU pipes are enabled. Such an occurrence often happens at the end of a data stream. This also happens because the architecture upstream from the shader unit 100 is functioning in 4 quad blocks. Therefore, there are situations in which only 4 quads or 8 quads are loaded into 12 enabled ALUs. The dynamic configurability of the shader unit 100 enables the thread to be changed from 12 quads to 4 or 8 quads if a full 12 quads are not received within a predetermined time period.

A thread becomes a partial thread when it has less than 12 quads. A partial thread can occur at the end of a data stream, or when a state change within the shader unit 100 is received in the middle of a thread being processed. When a partial thread is issued to the shader unit 100 without an accompanying state change, a deadlock situation could occur. There are two ways to resolve this deadlock. First, a shader unit flush can be done by inserting a shader register. Second, a shader unit autoflush can be configured in an autoflush control register (not shown). Once enabled, the shader unit 100 flushes out partial threads based on a programmable timeout value. The timeout value indicates the number of empty cycles to wait at the input before flushing out the partial thread.

The flow control sequencer 60 operates according to either a partial flow control mode or a full flow control mode. In the partial flow control mode, the flow control sequencer 60 executes one flow control instruction for a set of 12 quads every 4 clock cycles. In the full flow control mode, the flow control sequencer 60 executes one flow control instruction for a set of 12 quads every 8 clock cycles. The flow control sequencer 60 works in conjunction with the ALU sequencer 58. The flow control sequencer 60, the texture sequencer 58, and the ALU sequencer 62 issue their corresponding instructions in response to control instructions provided by the scheduler 56.

Within the shader unit 100, each processing unit 10, 20, 30, and 40 is an integrated circuit manufactured according to conventional methodologies. Yield is a well known concept in the art of manufacturing integrated circuits. The configurable nature of the ALU units provides an increase in yield for the processing units. For example, if during manufacturing, one of the ALUs on a 3 ALU processing unit is determined to be faulty and unusable, then the processing unit can still be used as a 2-ALU processing unit. In this case, a shader unit can be configured using processing units that each have one faulty ALU. As part of an assembled shader unit, the non-operable ALU unit within each processing unit is configured as the same ALU pipe, such as ALU10_*a*, ALU20_*a*. ALU30_*a*, and ALU40_*a* in FIG. 1, and the ALU pipe including the faulty ALUs is disabled by the sequencer so that there are 2 enabled ALU pipes.

The shader unit 100 provides expanded ALU processing bandwidth while maintaining a single input and a single output. This enables all ALU processing to be performed locally, as opposed to distributing the ALU processing over multiple shader units, which would require the management of input data distribution to the multiple shader units and coordination of the output from each shader unit. The dynamic configurability of the shader unit 100 promotes high-end performance for graphics applications including many ALU instructions and power savings capabilities for lower-end graphics applications that do not require as much ALU processing bandwidth. The configurable nature enables a determined number of ALUs to be shut down, thereby conserving power. Enabling a specific number of ALU pipes can be integrated with an operating mode of the computer. For example, if a laptop computer is currently configured in a "performance mode", then all ALU pipes are enabled to play, for example, a 3-D intensive video game. If a laptop computer is currently configured in a "power saving mode", then one or more ALU pipes are disabled to reduce power.

The shader unit 100 has been described above as including four processing units, each processing unit including three ALUs. Alternatively, the configurable shader unit can be configured to include more, or less, than four processing units, and each processing unit can be configured to include more, or less, than three ALUs. In general, the shader unit of the present invention is scalable to include more, or less, than the twelve ALUs described in relation to the shader unit 100. Additionally, the ALUs are described as being grouped by processing unit for convention only. It is a design consideration as to how many ALUs are included within each processing unit. Further, the ALUs have been organized as logical groups called ALU-pipes, and in general the shader unit is configurable to include N ALU-pipes. However, organizing the ALUs into ALU pipes is for convention only, and different types of logical groups can be utilized to dynamically configure a number of enabled ALUs.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made to the embodiments chosen for illustration without departing from the spirit and scope of the invention.

We claim:

1. A shader unit to process an input data stream, the shader unit comprising:
a sequencer associated with the shader unit to provide control instructions based on an amount of ALU bandwidth desired for a number of groups of ALUs; and
a plurality of processing integrated circuit chips coupled to the sequencer, each processing integrated circuit chip includes a plurality of arithmetic logic units, wherein each processing integrated circuit chip includes at least one defective arithmetic logic unit, further wherein each of the plurality of arithmetic logic units of each of the plurality of processing circuit chips is dynamically configurable to be enabled or disabled according to the control instructions provided by the sequencer instructions based on an amount of ALU bandwidth desired, thereby increasing a yield for processing integrated circuit chips wherein the sequencer dynamically configures a number of enabled arithmetic logic units and provides a same sized ALU instruction to each of the enabled ALUs.

2. The shader unit of claim 1 wherein each processing integrated circuit chip includes a same number of defective arithmetic logic units.

3. The shader unit of claim 2 wherein each processing integrated circuit chip includes a same number of arithmetic logic units.

4. The shader unit of claim 3 wherein all of the arithmetic logic units within the shader unit are logically configured into a plurality of groups, wherein each group includes one arithmetic logic unit from each processing integrated circuit chip.

5. The shader unit of claim 4 wherein when a first arithmetic logic unit on a first processing integrated circuit chip is defective, then each arithmetic logic unit within the group that includes the first arithmetic logic unit is also defective.

6. The shader unit of claim 5 wherein the arithmetic logic units included within a group comprising defective arithmetic logic units are disabled and powered off.

7. The shader unit of claim 4 wherein each group is coupled to a clock enable circuit.

8. The shader unit of claim 7 wherein the arithmetic logic units within a first logical group are powered off by disabling a corresponding first clock enable circuit.

9. The shader unit of claim 1 wherein the sequencer comprises an input buffer to receive an input stream of pixel data and a scheduler to direct a block of the received pixel data to be processed on each enabled arithmetic logic unit.

10. The shader unit of claim 9 wherein the sequencer further comprises an arithmetic logic unit sequencer that generates an arithmetic logic unit instruction, wherein the arithmetic logic unit sequencer sends the arithmetic logic unit instruction to each enabled arithmetic logic unit in response to a control instruction sent by the scheduler.

11. The shader unit of claim 10 wherein each enabled arithmetic logic unit executes one arithmetic logic unit instruction per four clock cycles.

12. The shader unit of claim 10 wherein each arithmetic logic unit instruction corresponds to a processing instruction within a software program being executed by the shader unit.

13. The shader unit of claim 1 wherein the plurality of processing integrated circuit chips comprises four processing integrated circuit chips and each processing integrated circuit chip includes three arithmetic logic units.

14. The shader unit of claim 1 wherein each of the plurality of the arithmetic logic units processes four pixels of data per four clock cycles.

15. A shader unit to process an input data stream, the shader unit comprising:
   a sequencer associated with the shader unit to provide control instructions;
   a plurality of processing integrated circuit chips coupled to the sequencer, each processing integrated circuit chip includes a plurality of arithmetic logic units, wherein each processing integrated circuit chip includes at least one defective arithmetic logic unit, further wherein each of the plurality of arithmetic logic units of each of the plurality of processing integrated circuit chips is dynamically configurable to be enabled or disabled according to the control instructions provided by the sequencer, thereby increasing a yield for processing integrated circuit chips;
   wherein each processing integrated circuit chip includes a same number of defective arithmetic logic units;
   wherein each processing integrated circuit chip includes a same number of arithmetic logic units;
   wherein all of the arithmetic logic units within the shader unit are logically configured into a plurality of groups, wherein each group includes one arithmetic logic unit from each processing integrated circuit chip; and
   wherein when a first arithmetic logic unit on a first processing integrated circuit chip is defective, then each arithmetic logic unit within the group that includes the first arithmetic logic unit is also defective.

16. The shader unit of claim 15 wherein the arithmetic logic units included within a group comprising defective arithmetic logic units are disabled and powered off.

* * * * *